United States Patent [19]
White

[11] Patent Number: 5,295,703
[45] Date of Patent: Mar. 22, 1994

[54] LOCKABLE ARTICULATED TRAILER

[76] Inventor: Donald J. White, 1212 S. Muskogee Ave., Russellville, Ark. 72801

[21] Appl. No.: 973,673

[22] Filed: Nov. 9, 1992

[51] Int. Cl.$^5$ .............................................. B62D 13/06
[52] U.S. Cl. ................................. 280/414.1; 280/445; 280/475; 254/418
[58] Field of Search ................................. 254/418, 420; 280/414.1, 445, 443, 103, 444, 475, 476.1, 763.1, 766.1

[56] References Cited

U.S. PATENT DOCUMENTS

| | | | |
|---|---|---|---|
| 3,536,338 | 10/1970 | Stueven | 280/445 |
| 3,663,040 | 5/1972 | Weaver et al. | 280/414.1 |
| 3,738,672 | 6/1973 | Datron | 280/3 |

FOREIGN PATENT DOCUMENTS 1296605  5/1962  France .............................. 280/766.1

*Primary Examiner*—Margaret A. Focarino
*Assistant Examiner*—Victor E. Johnson
*Attorney, Agent, or Firm*—Stephen D. Carver; J. L. Mahurin

[57] ABSTRACT

A selectively lockable, articulated boat trailer comprising a carriage having a selectively pivoted front axle controlled by a jack column assembly. The carriage comprises a wheeled trailer and a separate front axle assembly adapted to be coupled to a conventional tow vehicle. The wheeled axle of the trailer is suspended perpendicular to the longitudinal axis of the trailer. A system for retrofitting to existing trailers includes independent framework that receives the tongue of the trailer fixed to the jack column assembly. Regardless of the configuration, retrofit or original equipment, the separate front axle assembly is operatively coupled to the trailer by the jack column assembly. The jack column assembly provides lifting action and a pivot between the trailer section and the separate front axle assembly. Sleeved portions of the jack column assembly coaxially rotate relative to one another. The trailer is rigidly affixed to one portion and the separate front axle assembly pivotally secured to the other portion. The sleeved portions are maintained in a coaxial relationship. The sleeves captivate and rotate on an elongated insert, thereby providing articulation. The insert is in contact with bearings or bushings fitted into the sleeves to receive the insert. A locking mechanism mounted to the sleeved portion is secured to the separate front axle assembly. The lock can be set to two different settings, including a road position and a "backing up" position. High-centering problems are eliminated since the front axle prevents the front portion of the frame contacting the ground.

14 Claims, 6 Drawing Sheets

LOCKABLE ARTICULATED TRAILER

BACKGROUND OF THE INVENTION

The present invention broad relates to trailers adapted to be towed by a vehicle. In particular the present invention relates to articulated boat trailers. Prior art relevant to the herein disclosed invention can be found in U.S. patent class 280 subclasses 103, 414 and 445.

The art is replete with trailers to perform various tasks, including transporting sailboats. Generally such trailers employ bunks to cradle the sailboat and a single or tandem axle arrangement disposed between the rear and the mid point of the trailer. Additionally, the art discloses various arrangements to steer the wheels of an articulated axle disposed toward the front of a trailer. The wheels of some of these steerable axles are lockable in a "straight ahead" position. Of course it is well known in the prior art to dispose a jack at the front of a trailer. Additionally, various means to accomplish the disposition of this jack and numerous jack related structures are present in the prior art. Another addition made to many boat trailers is an extensible tongue. When the tongue is extended the boat is relatively far down a boat ramp in respect to the tow vehicle.

Miller U.S. Pat. No. 4,094,527 discloses a sailboat trailer. In particular, this trailer has a rocker system for centering the keel of the sailboat. This patent is illustrative of the numerous trailer patents issued over the years.

Various systems for providing steering to a steerable trailer axle are disclosed in Baker, U.S. Pat. No. 4,208,063; Drewek, 4,042,255; Folkert, 3,753,580 and Schramm, 3,105,704. Some draft type steerable axles are disclosed in Jacobs, U.S. Pat. No. 1,856,997; Kelsy, 2,608,417; and Ronning, 2,650,100.

Most illustrative of these steering mechanisms and draft mechanisms is Barker U.S. Pat. No. 2,734,754. This is a pivotally connected draft tongue with selective steering mechanism. It discloses a locking mechanism for the front wheels of a trailer during backing operations.

Faurenhoff U.S. Pat. No. 4,961,589 discloses am attachment for the base of a trailer jack. This attachment allows the tongue of the trailer to be adjusted in a horizontal plane to facilitate hitching or trailer placement.

Spear U.S. Pat. No. 3,826,470 discloses a scissor type trailer jack which stows in a horizontal position.

Merrill U.S. Pat. No. 5,087,063 speaks to a retractable jack and support for trailer tongues.

Halloway U.S. Pat. No. 5,013,011 discloses a self-deploying stabilizing jack. This jack is intended for use by Recreational Vehicles or other similar vehicles.

Nudd U.S. Pat. No. 5,067,692, discloses a jack employing a bracket to facilitates disposing the jack in a vertical or horizontal position. The horizontal position in this instance is used only for storage.

The prior art boat trailers have several shortcomings. For example, the load of a conventional trailer needs to be more or less centered over the axles of the trailer to provide the proper tongue weight. If the tongue weight is too great or too little the trailer is difficult to control. Conventional trailers often drag due to excessive overhang behind the axle. Articulated or steerable axle trailers are difficult to back. Furthermore, extending the trailer tongue length on many conventional trailers is not practical due to the strength required for such an unsupported span. Additionally, ground clearance for the extension as the trailer starts down an incline such as a boat ramp is troublesome.

Therefore, a trailer with a front axle which pivots to steer front wheels is desirous to improve cornering, weight distribution characteristics and clearance. It is further desirous to provide the trailer with a jack to raise the trailer on one or more pivoting wheels. This will provide ground clearance under the front tires so the axle can be locked in a straight position. As a result during backing operations the trailer will handle similar to a conventional single or double axle trailer. The desired configuration would also prevent "high centering" of the trailer frame as it passes over an incline such as a boat ramp.

SUMMARY OF THE INVENTION

The present invention provides the comfort and smoothness of a four wheel trailer and the ease of backing a two wheel trailer. A self contained jack is employed to lift the front axle and lock the front axle and tongue assembly in the straight position.

Therefore, my trailer provides a front axle which pivots to improve cornering, weight distribution characteristics and clearance. The jack of the present invention raises the trailer on a pivoting wheel to provide ground clearance under the front tires so the axle can be locked in a straight position. As a result during backing operations the trailer will handle similar to a conventional single or double axle trailer. High centering problems are eliminated since the front axle prevents the front portion of the frame contacting the ground.

My lockable, articulated boat trailer is primarily comprised of a carriage and a jack column assembly coupling the two major components of the carriage. The major components of the carriage are a wheeled trailer and a separate front axle assembly.

The wheeled trailer is adapted to receive a load, such as a boat. This type of trailer is generally comprised of side frame rails and cross members. Bunks receive and support the boat. A winch and bow rest are generally disposed at the forward end of the trailer supported on a tower. The wheeled axle of the trailer is suspended perpendicular to the longitudinal axis of the trailer.

The present invention may be retrofitted to existing trailers. Independent framework is necessary to couple the retrofit to the trailer. The framework receives the tongue of the trailer. The framework is bolted to the trailer and is fixed to the jack column assembly. Regardless of the configuration, retrofit or original equipment, the separate front axle assembly is linked to the trailer by the jack column assembly.

The separate front axle assembly comprises an axle and a tow bar assembly with a ball receptive or other type hitch. The hitch lockably engages a trailer ball disposed on a tow vehicle. The separate front axle assembly is pivotally mounted to the jack column assembly which in turn is articulately secured to the trailer.

The jack column assembly provides lifting action and a pivot between the trailer section and the separate front axle assembly. Sleeved portions of the jack column assembly coaxially rotate relative to one another. The trailer is rigidly affixed to one portion and the separate front axle assembly pivotally secured to the other portion. The sleeved portions are maintained in a coaxial relationship. The sleeves captivate and rotate on an elongated insert, thereby providing articulation. The insert is in contact with bearings or bushings fitted into the sleeves to receive the insert.

The extensible jack is disposed within the sleeve. The extensible jack is comprised of an outer housing, a crank assembly and an extensible stanchion. The stanchion protrudes from the bottom of the jack column assembly and mounts a dolly wheel. The crank assembly used to extend the jack is mounted at the top of the jack column assembly on a "U" shaped bracket. Further, on trailers employing the present invention as original equipment, the winch and bow rest maybe repositioned to be rotatably mounted to the top of the jack column assembly. If so fitted the extensible jack may be employed to adjust the ride height of the boat as well as lifting the front portion of the trailer.

A locking mechanism is mounted to the sleeved portion secured to the separate front axle assembly. A spring biased "T" shaped handle is used to operate the lock. An arm extends perpendicularly from the handle and terminates in a perpendicular selector pin. A dog assembly is disposed approximately midway between the handle and the selector pin upon the arm. A spring loaded latching pin in the dog assembly indexes with a locking boss defined in the front face of the sleeved portion secured to the trailer to torsionally lock the sleeved portions. Consequently, the front axle is locked parallel to the trailer axle.

Upper and lower pads define registration bosses in the sleeved portion affixed to the separate front axle. The selector pin from the lock passes through a tab depending down from the "U" shaped bracket mounting the crank assembly to index with the upper boss. This prevents the extensible jack from being pushed out of the insert when the dolly wheel is cranked into contact with the ground. Alternatively, the selector pin passes through a tab extending upward from the dolly wheel and indexes with the lower boss. This retains the jack within the insert and allows the top of the extensible jack to be elevated. In this manner the bow of the boat can be elevated when the bow rest is mounted to the top of the jack column assembly.

In operation, the lock can be set to two different settings. The road position, with the selector pin in the lower registration boss, through the dolly wheels tab. In this position the sleeved portions are free to rotate about the insert allowing the trailer assembly to freely articulate. Additionally in this position the jack may be employed to adjust the ride height of the bow of the boat if the bow rest has been repositioned to the top of the jack column assembly.

The lock is moved from the road position to the ramp position by pulling outward on the "T" shaped handle to overcome the spring pressure. The handle is rotated until the selector pin registers through the tab depending downward from the crank gear box bracket engaging the upper registration boss. In this position when the front axle of the trailer is parallel with the rear axle of the trailer the spring biased latching pin will index with the locking boss, torsionally locking the sleeved portions and axles.

If the tow vehicle and longitudinal axis of the trailer are not in alignment then the locking mechanism may be engaged by manually manipulating, pushing or pulling, the front of the trailer from side to side or by moving the tow vehicle. The spring loaded latching pin will engage automatically when alignment is obtained.

Therefore, it is an object of the present invention to provide a lockably articulated trailer for a wide variety or specific applications.

Another object of the present invention is the use of a mechanical interlocking mechanism which allows an articulated axle to be locked.

A related object of the present invention is to allow manual or mechanical alignment to engage the interlock and lock the articulated axle straight.

A related object of the present invention is to provide a trailer that, when locked with the pivoting dolly wheel extended, can be backed similarly to a single axle trailer.

Another object of the present invention is to support the weight of the front of the trailer to alleviate tongue weight limitations of the towing vehicle.

Another object of the present invention is to allow shifting the rear axle(s) of a trailer rearward, reducing overhang and thereby dragging.

Another object of the present invention is, to allow a boat on a boat trailer to be shifted relative to the trailer's rear axle.

A particular object of the present invention is, to allow a boat trailer's rear axle to be shifted rearward, relative to prior art trailer axle positions near the center of gravity of the load, thereby allowing the boat to be lowered as the keel will not interfere with suspension movement of said axle.

A related object of the present invention is to allow a sailboat to ride with the keel, and therefore the center of gravity forward of the rear axle and lower on the trailer.

A further related object of the present invention is to allow the keel of a sailboat to be as low as the top of the axle without fear of interference from the axle.

A related object of the present invention is to allow trailering of larger sailboats in contrast to trailers of the prior art.

Yet a further object of the present invention is to retrofit existing trailers with an attachment to mount the existing ball hitch and bolt to the existing frame of a boat or travel trailer Yet another object of the present invention is to disclose an articulated axle responsive to irregular road surfaces by pivoting it at its center point.

An object of a first alternative embodiment of the present invention is to provide an articulated trailer, employing the principles herein disclosed, adapted for use in the motor freight industry.

An object of a second alternative embodiment of the present invention is to allow a front articulated axle to be adjustably locked in positions other than straight ahead, to facilitate crossing of a bridge in military tactical applications wherein the bridge is of insufficient strength to support the weight of the trailer and the tow vehicle simultaneously.

A related particular object of the second alternative embodiment is to allow a tow vehicle separated from a trailer to employ cables, chains or the like to pull a trailer across a bridge.

A related object of the second alternative embodiment is to allow the interim adjustment of said locking positions during towing.

These and other objects and advantages of the present invention, along with features of novelty appurtenant thereto, will appear or become apparent in the course of the following descriptive sections.

BRIEF DESCRIPTION OF THE DRAWINGS

In the following drawings, which form a part of the specification and which are to be construed in conjunction therewith, and in which like reference numerals have been employed throughout wherever possible to indicate like parts in the various views.

DETAILED DESCRIPTION

Figure 1:
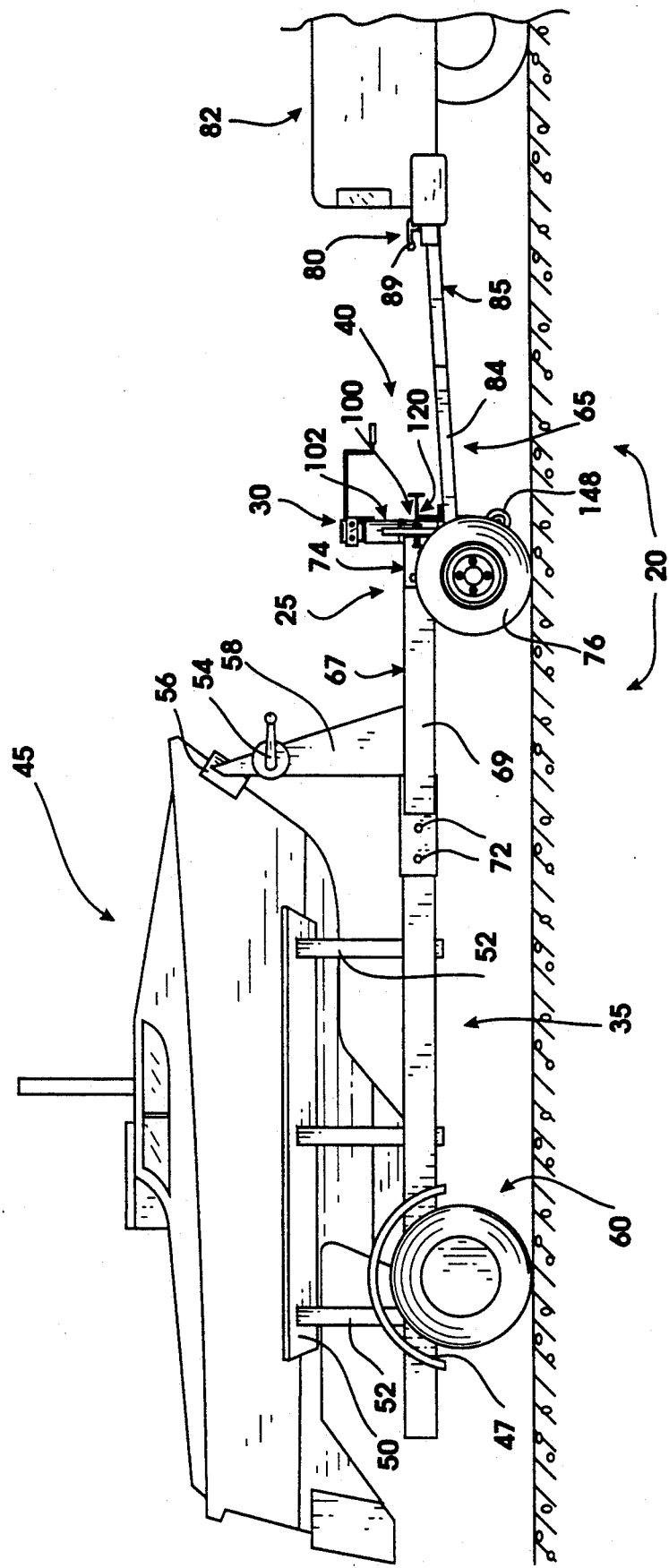
FIG. 1 is a fragmentary, side elevational view showing one best mode of my trailer in use hauling a boat.

With reference now the accompanying drawings my lockable, articulated boat trailer is broadly designated by the reference numeral 20. The preferred embodiment is primarily comprised of a carriage 25 and a jack column assembly 30 coupling the two major components of the carriage 25. The carriage further comprises a wheeled trailer 35 and a separate front axle assembly 40.

Figure 2:
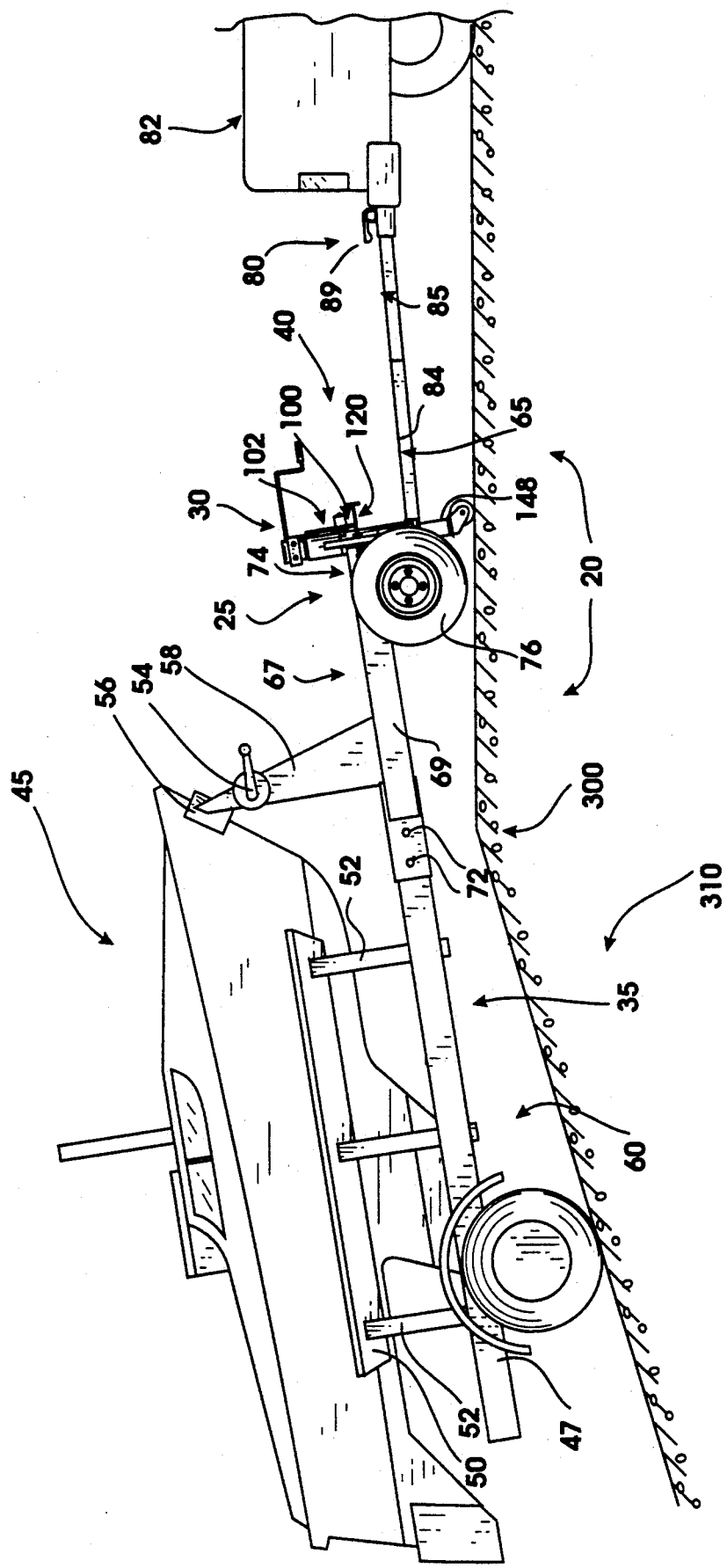
FIG. 2 is a side elevational view similar to FIG. 1, showing the trailer backing down a launching ramp.
Figure 3:
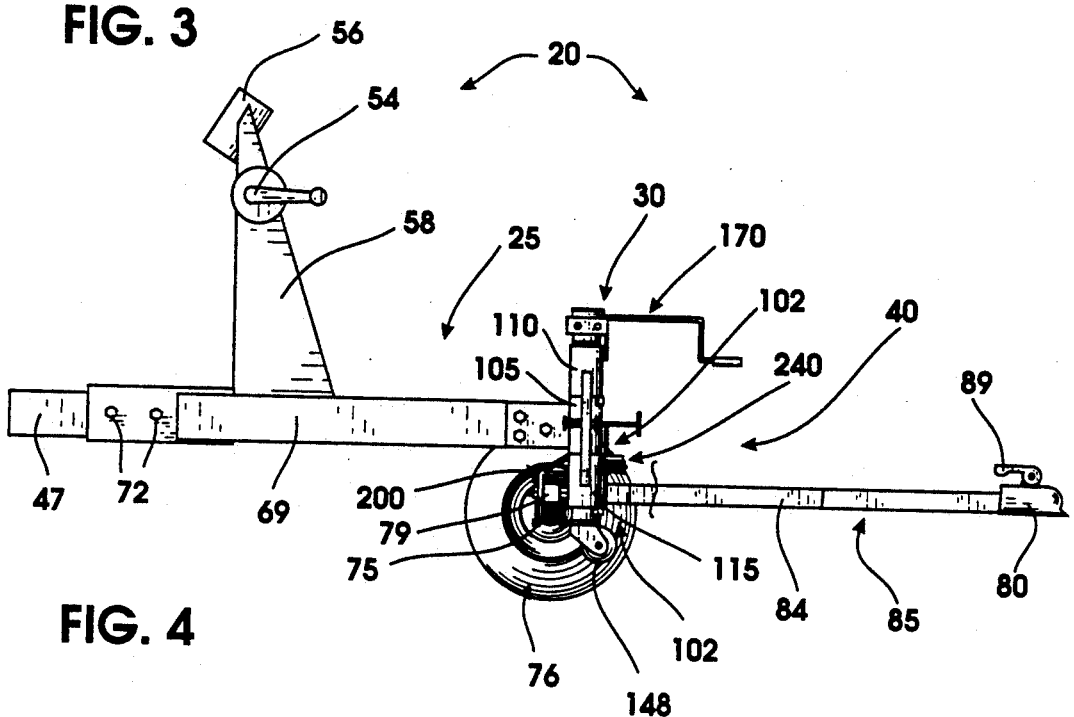
FIG. 3 is an enlarged, fragmentary elevational view of the trailer mid-portion and the preferred jack column assembly.

In the preferred embodiment the wheeled trailer 35 is adapted to receive a load. As illustrated in FIGS. 1 and 2 the trailer may be adapted to receive a boat 45. Such a trailer is generally comprised of side frame rails 47, a plurality of cross members 49 as well as bunks disposed 50 on stanchions 52. The bunks 50 receive and support the boat 45. A winch 54 and bow rest 56 are generally disposed at the forward end of the trailer 35 supported on a tower 58. The wheeled axle 60 of the trailer 35 is suspended from the side frame rails 47, fixed perpendicular to the longitudinal axis of the trailer 62.

Figure 4:
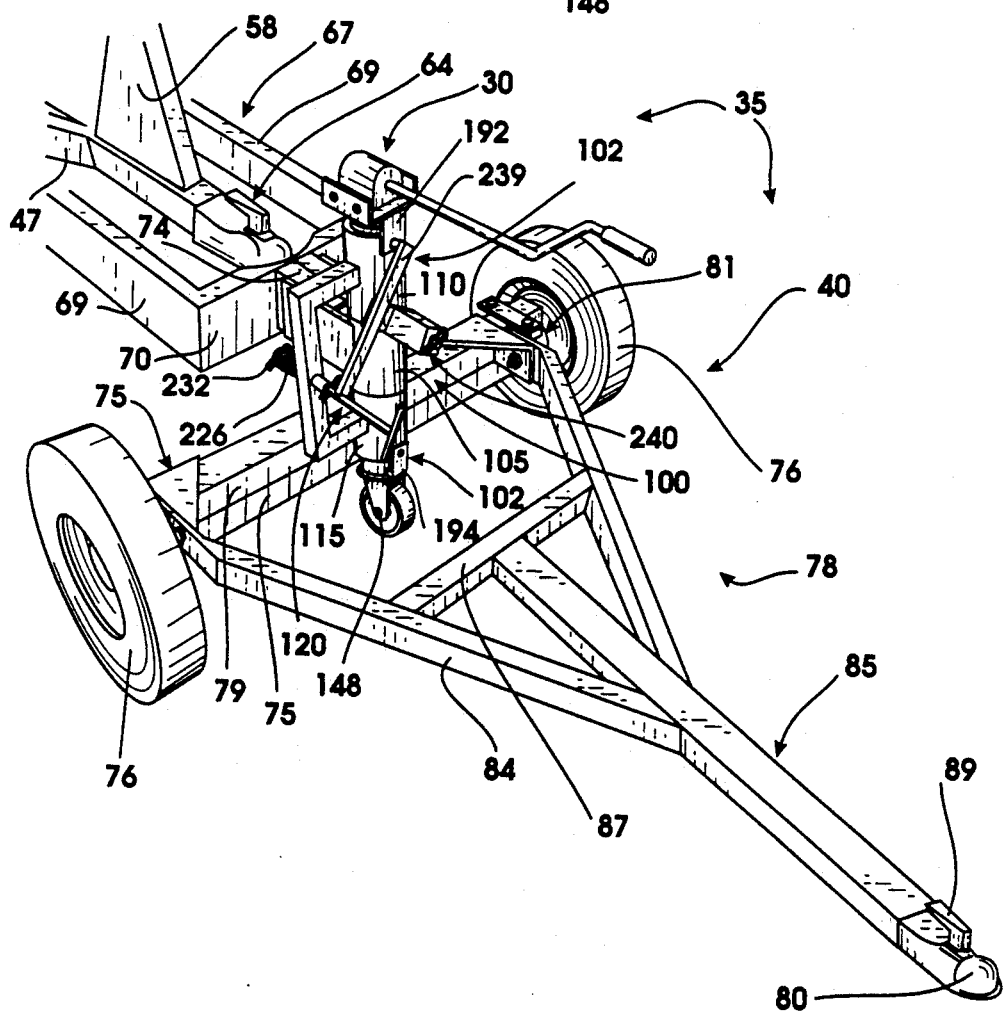
FIG. 4 is an enlarged fragmentary perspective view of the jack column assembly.
Figure 7:
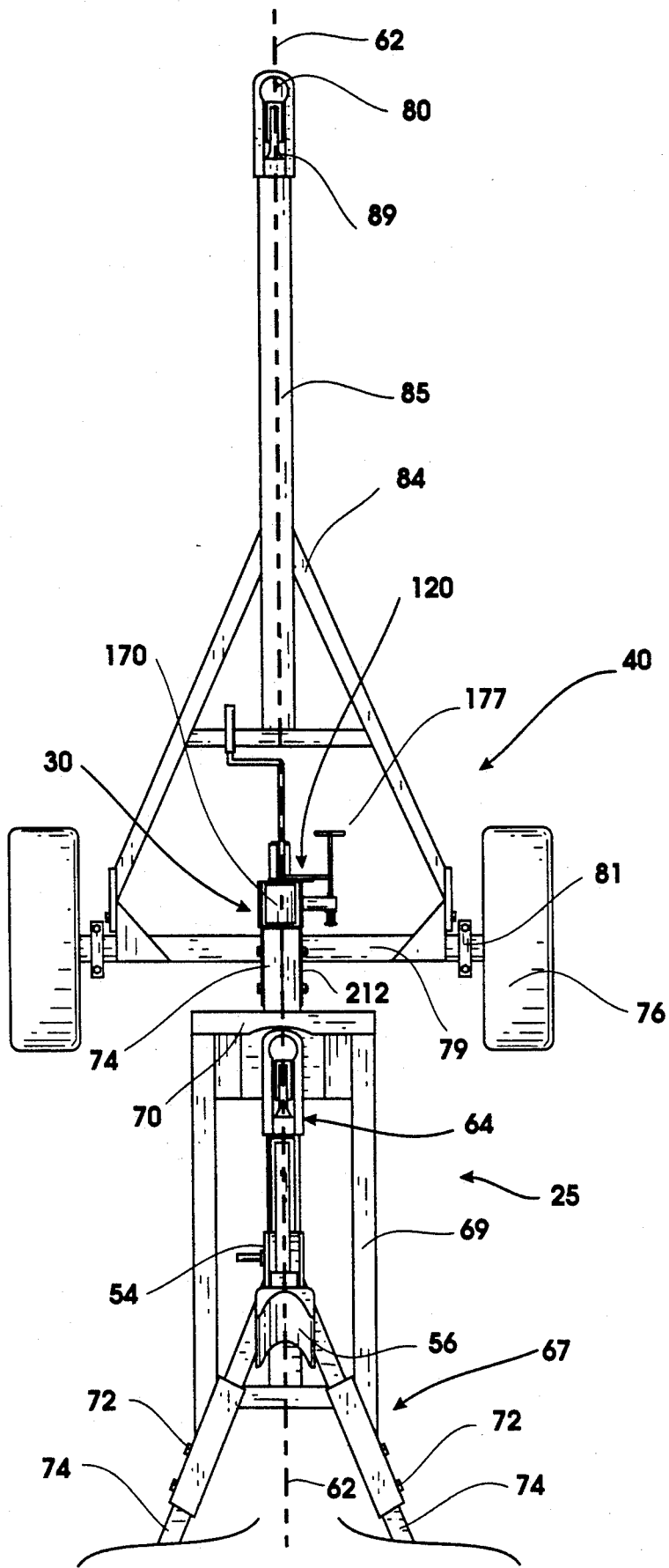

As illustrated in FIGS. 4 and 7, a trailer 35 complete with a towing ball receptive tongue 64 can employ the present invention as a retrofit 65. The retrofit embodiment 65 has independent framework 67 necessary to couple it to the trailer 35. This framework 67 comprises two side rails 69 welded perpendicular to a front cross member 70. A conventional trailer ball is secured to the aft side of the front cross member 70 to receive the tongue 64 of the trailer 35. The side rails 69 are bolted to the trailer frame side rails 47 by a plurality of bolts 72. The framework is fixed to the jack column assembly 30 by a mount 74 extending forward from the front cross member 70 Regardless of the configuration the separate front axle assembly 40 is linked to the trailer 35 by the jack column assembly 30.

The separate front axle assembly 40 comprises an axle 75 mounting a wheel 76 at either end. A tow bar assembly 78 is pivotally secured to a cross rail 79. The cross rail in turn is mounted to the axle 75 by a "U" bolt and shackle combination 81. The tow bar assembly comprises two converging side rails 84 joining with an elongated tongue 85. The tongue 85, in addition to joining with the converging side rails 84 is secured to a cross member 87 which laterally extends between the converging side rails 84. Further, the tongue 85 terminates in the trailer ball receptive hitch 80. The hitch lockably engages a trailer ball disposed on a tow vehicle 82. The hitch 80 is locked or unlocked by selectively activating a hitch lock 89. The separate front axle assembly 40 is pivotally mounted to the jack column assembly 30 which in turn is pivotally secured to the trailer 35.

The jack column assembly 30 provides lifting action and the capacity to lockably articulate the carriage 25, providing a pivot between the trailer section 35 and the separate front axle assembly 40. Portions of the jack column assembly 30 coaxially rotate relative to one another. The trailer 35 is secured to one portion 100 and the separate front axle assembly 40 is secured to the other portion 102, thereby providing the aforementioned articulation.

Figure 5:
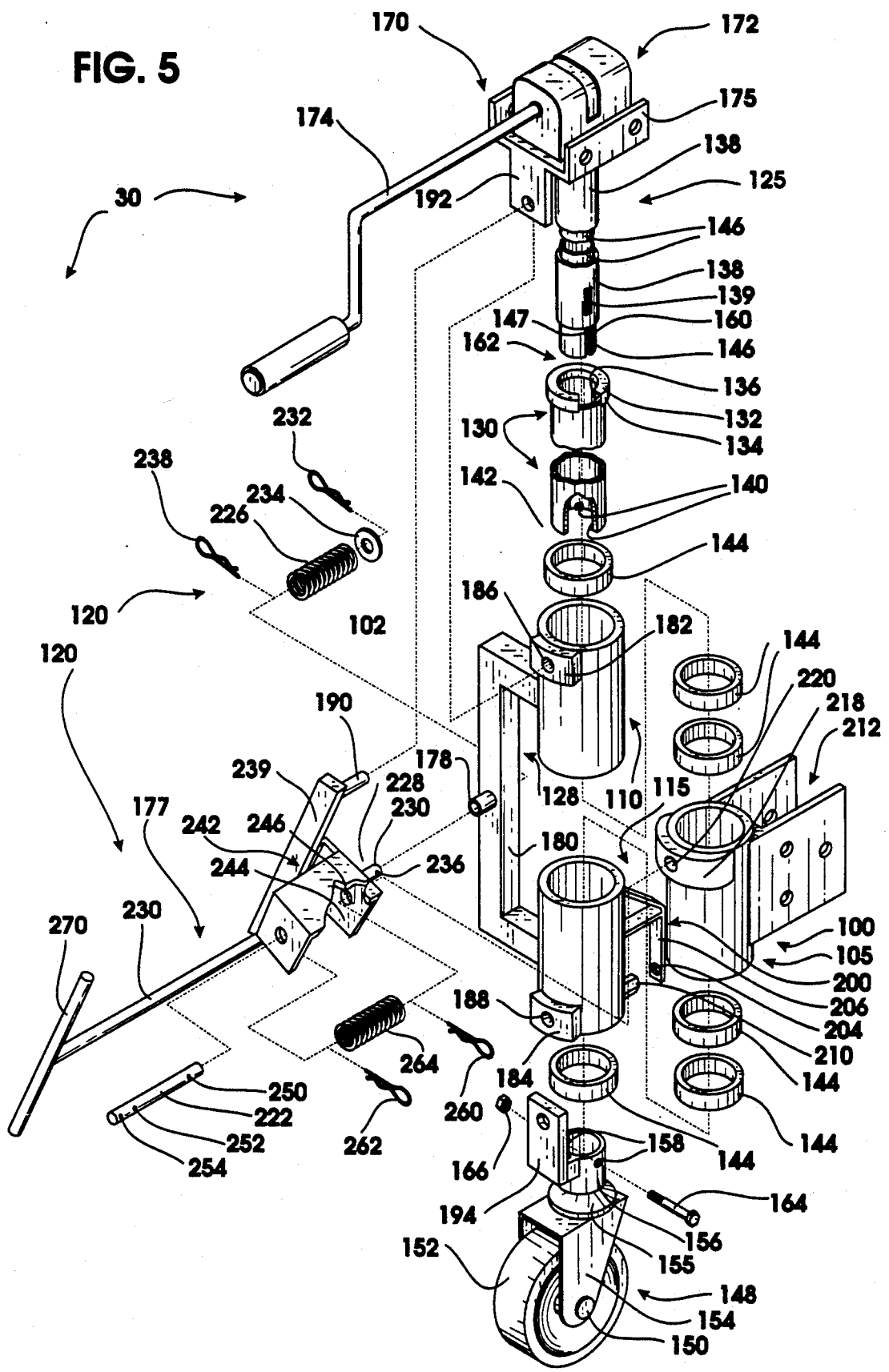
FIG. 5 is a fragmentary, exploded isometric view of the preferred jack column assembly.
Figure 6:
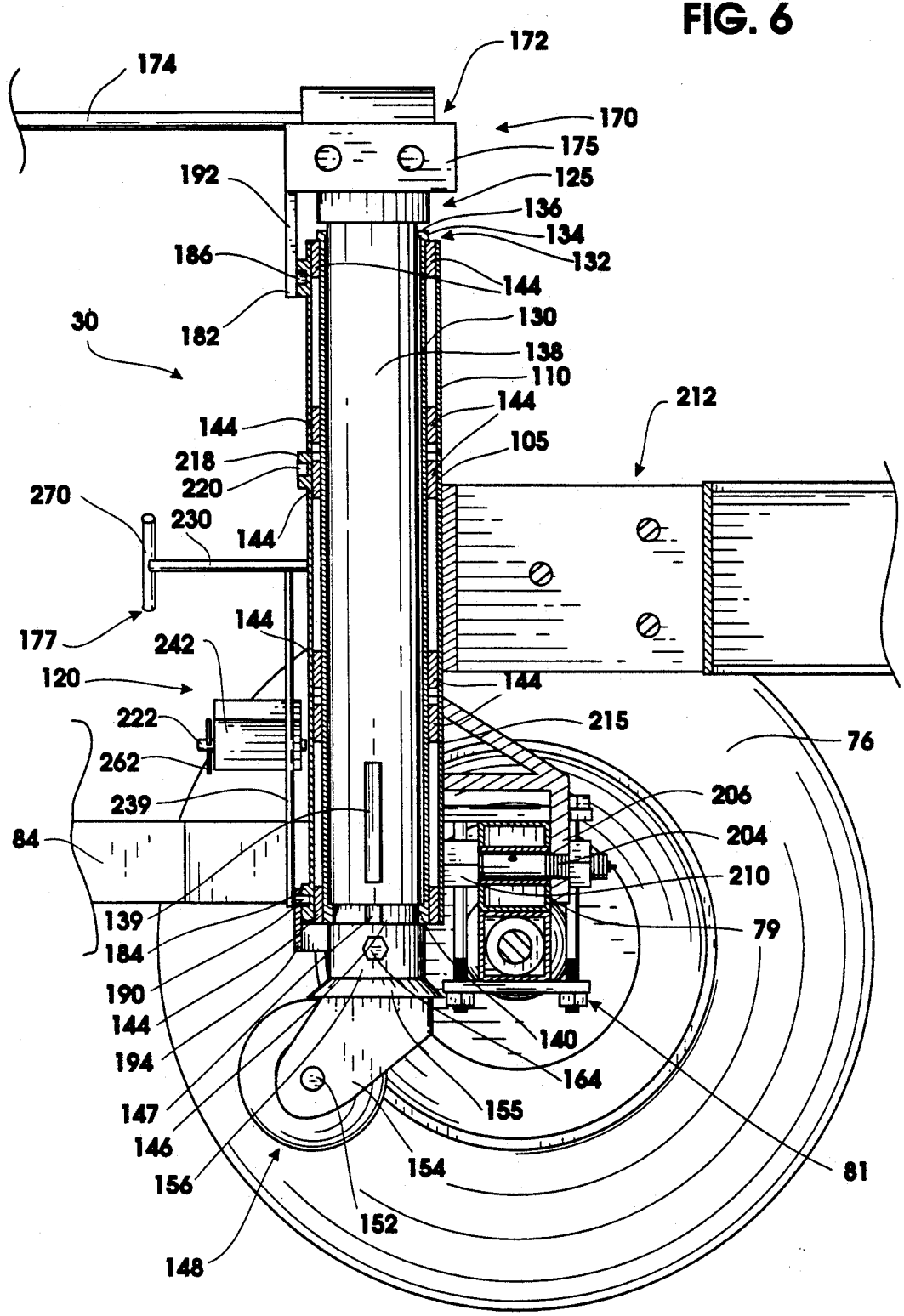
FIG. 6 is an enlarged, fragmentary side elevational view of the jack column assembly; and, FIG. 7 is a top plan view of the mid portion of the preferred trailer.

The jack column assembly 30 comprises three sleeves 105, 110 and 115, a lock assembly 120 and a central extensible jack 125 (FIGS. 5 and 6). A center sleeve 105 is captivated between upper and lower sleeves 110 and 115 in a spaced apart relationship by a "C" shaped link 128. All three sleeves 105, 110 and 115 are maintain in a coaxial relationship. The sleeves 105, 110 and 115 captivate and rotate on a press fitted insert 130. The extensible jack 125 which is of a somewhat conventional configuration is disposed within the insert 130. Further, on trailers employing the present invention as original equipment the winch 54 and bow rest 56 may be repositioned to be rotatably mounted on top of the jack column assembly 30. If so fitted the extensible jack 125 may be employed to adjust the ride height of the boat 45 as well as lifting the front portion of the trailer 35. The insert 130 has an upper shoulder 132 the outer portion 134 of the shoulder 132 supports the insert 130. The inner portion 136 provides a bearing surface for the housing 138 of the extensible jack 125. The housing 138 of the extensible jack 125 is supported within the insert 130 by a series of tabs 140 disposed about the interior of the insert 130 at its lower extreme 142. Bearings or bushings 144 are disposed within the sleeves 105, 110 and 115 to receive the insert 130.

The extensible jack comprises 125 the outer housing 138 in contact with the insert 130 and an extensible stanchion 146 which protrudes from the bottom of the jack column assembly 30. The housing 138 and the stanchion 146 have an indexing groove 139 and 147, respectively, to torsionally index the housing 138 and the stanchion 146, thereby preventing relative rotation. The extensible stanchion mounts a dolly wheel 148. The dolly wheel is comprised of an axle 150 mounting one or more wheels 152 to a bracket 154 which in turn is roller bearing 155 mounted to a stub stanchion 156. The stub stanchion 156 defines a pair of indexed orifices 158 intended to index with a pair of indexed orifices 160 in the lower extreme 162 of the extensible stanchion 146. A bolt 164 and associated nut 166 secure the dolly wheel 148 to the extensible stanchion 146 via the orifices 158 and 160. A right angle crank assembly 170 is employed to extend the jack 125. It comprises a gear assembly 172 and a horizontally disposed crank 174. The gear assembly 172 is mounted at the top of the jack column assembly 30 on a "U" shaped bracket 175.

The upper and lower sleeves 110 and 115 as mentioned above are secured together by a "C" shaped link 128. This link is rigid and mounts a spring loaded handle 177 through an orifice 178 in the vertical element 180 of the "C" shaped link. This handle 177 is used to actuate the lock 120 as detailed below. Further, the upper and lower sleeves 110 and 115 each have a pad 182 and 184 defining a registration boss 186 and 188. The bosses 186 and 188 are employed with an element of the lock 120 to secure the conventional extensible jack 125 within the sleeves 105, 110 and 115 vertically. A selector pin 190 from the lock 120 passes through a tab 192 depending down from the "U" shaped bracket 175 mounting the crank gear assembly 172, into the boss 186 in the upper sleeve 110. This prevents the extensible jack 125 from being pushed out of the sleeves 105, 110 and 115 when the dolly wheel 148 is cranked into contact with the ground. Alternatively, the selector pin 190 passes through a tab 194 extending upward from the dolly wheel's stub stanchion 156 and indexes with the boss 188 in the lower extent of the lower sleeve 115. This interlock prevents the extensible jack 125 from being pushed out also.

The lower sleeve 115 also provides the point at which the jack column assembly 30 is pivotally mounted to the separate front axle assembly 40. A triangular bracket 200 extends from the back of the lower sleeve 115 and captivates framework associated with the front axle or the axle 75 itself. A pivot bolt passes through orifice 204 in the leg 206 of the bracket 200 and orifices disposed in the axle. A threaded boss 210 secures the bolt. In the preferred embodiment the bolt is hollow and employs a grease fitting to facilitate lubrication of the joint.

The central sleeve 105 has a "U" shaped flange 212 extending from its back. This flange 212 captivates the mount 74 extending forward from the frame of the trailer 35. In the retrofit embodiment 65 the flange 212 captivates the mount 74 extending forward from the front cross member 70 of the framework 67. A pad 218 defining a locking boss 220 is disposed on the front face of the central sleeve 105. This boss 220 receives a latch comprising a pin 222 associated with the locking mechanism 120 to lock the front axle 75 parallel to the rear axle 60.

The locking mechanism 125 as mentioned above is mounted through an orifice 178 defined in the "C" shaped link 128 between the upper and lower sleeves 110 and 115. A "T" shaped handle passes 177 through the orifice 178 and is biased by a spring 226 disposed on the extreme end 228 of the handle's shaft 230. The spring 226 is captivated between a clip 232 with a washer 234 and the "C" shaped link 128. The clip 232 passes through an orifice 236 defined in the outer extreme 228 of the handle shaft 230. A second clip 238 passes through an orifice defined in the mid portion of the handle shaft 230 on the opposite side of the "C" shaped link 128 relative to the first clip 232, thereby holding the handle 177 spring biased. An arm 239 extends perpendicular from the handle shaft 230 and perpendicularly terminates in the selector pin 190. A dog assembly 240 is disposed approximately midway between the handle shaft 230 and the selector pin 190 upon the arm 239.

The dog assembly 240 comprises a rectangular housing 242 which mounts the spring loaded latching pin 222 perpendicular to the arm 239. The housing 242 is constructed of angle iron with square plates spanning the ends 244. Pilot holes 246 in the ends 244 receive the pin 222. The pin 222 has three diametrical orifices 250, 252 and 254 passing through it to receive clips 260 and 262. The clip 260 nearest the sleeves 105, 110 and 115 captivates a spring 264 disposed on the pin 222 within the housing 242. The second clip 262 passes through one of the other orifices 252 or 254 outside the housing 242, opposite the sleeves 105, 110 and 115. The second clip 262 limits the travel of the latching pin 222 if disposed in the orifice 254 further most from the sleeves 105, 110 and 115 It locks the pin 222 in a retracted position when disposed in the orifice 252 closest to the sleeves 105, 110 and 115. The latching pin 222 is intended to index with the boss 220 defined in the front face of the central sleeve 105 to torsionally lock the central sleeve 105 relative to the upper and lower sleeves 110 and 115. Consequently, the front axle 75 when locked will be parallel to the trailers' axle 60.

In operation, the lock 120 of the preferred embodiment can be set to two different settings. The road position is illustrated in FIG. 1. Here, the selector pin 190 is disposed in the registration boss 188 of the lower sleeve 115 and passes through the tab 194 extending upwardly from the dolly wheel 148. In this position the central sleeve 105 is free to rotate about the insert 130. This allows the assembly 20 to freely articulate.

The lock 120 is moved from the road position to the ramp position by pulling outward to overcome the spring pressure of the "T" shaped handle 177. The cross piece 270 of the handle 177 is rotated until the selector pin 190 registers through the tab 192 depending downward from the crank gear bracket 175. The pin 190 engages the registration boss 186 disposed at the top of the upper sleeve 110. In this position the spring loaded pin 222 will contact the pad 218 in which the central sleeve locking boss 220 is defined. When the front axle 75 is parallel with the rear axle 60 of the trailer 35 the spring biased pin 222 will index with the locking boss 220 locking the front axle 75. In other words, the central sleeve 105 is torsionally locked relative to the upper and lower sleeves 110 and 115.

When locked in the road position the trailer 20 provides a front axle 75 which pivots to improve cornering, weight distribution characteristics and clearance. When locked in the ramp position the jack column assembly 30 of the present invention can raise the trailer on a pivoting dolly wheel 148 to provide ground clearance under the front wheels 76 so the front axle 75 can be locked in a straight position. As a result during backing operations the trailer 20 will handle similar to a conventional single or double axle trailer. As illustrated in FIG. 2, high centering problems are alleviated since the front axle prevents the front portion of the frame side rails 47 contacting the ground 300 when maneuvering the trailer 20 on a boat ramp 310.

If the tow vehicle 82, separate front axle assembly 40 and longitudinal axis 62 of the trailer 35 are not in alignment then the lock 120 may be engaged by manually manipulating, pushing or pulling, the front of the trailer 20 from side to side or by moving the tow vehicle 82. The spring loaded latching pin 222 will ride upon the pad 218 disposed on the central sleeve 105 until it engages the locking boss 220, automatically locking.

If the bow rest 54 has be repositioned to be rotatably mounted on top of the jack column assembly 30, the jack may be employed to raise the bow rest 54 when the lock 120 is in the road position. This allows the ride height and angle of the boat 45 to be adjusted.

An alternative embodiment of the present invention is adapted for use in the motor freight industry. The "C" shaped link 128 of the present invention is affixed to the trailer 35 portion of a semi-trailer combination. The central sleeve 110 of the present invention is connected to the tractor via the tongue hitch an associated hardware and the locking boss pad 182 disclosed above is replaced with a collar. The collar defines a plurality of locking orifices 186, thereby allowing multiple latching pins 222 to be used. Alternatively the pins and bosses can be replaced with a spline and collar arrangement.

Yet, another alternative embodiment of the present invention would facilitate the use of trailers 35 in a tactical military situation. In particular, a vehicle-trailer combination employing the present invention which encounters a bridge of insufficient strength to support the weight of the combination would be uncoupled. The tow vehicle 82 would proceed across the bridge and cables, chains or the like would be employed to pull the trailer 35 across the bridge. Further, the present invention 20 would be fitted with a horizontally adjustable locking pin or collar to facilitate adjustment of the tracking of the trailer 35 while being pulled separate from the tow vehicle 82.

From the foregoing, it will be seen that this invention is one well adapted to obtain all the ends and objects herein set forth, together with other advantages which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. An articulated trailer comprising:
   a carriage adapted to receive a load to be transported, said carriage comprising a rear, fixed, wheeled axle and a separate wheeled front axle, said front wheeled axle comprising tongue means for coupling said carriage to a tow vehicle;
   extensible jack column means for normally pivotally mounting said wheeled front axle, said jack column means comprising a first portion comprising a tubular central sleeve, and a second portion comprising spaced apart, upper and lower tubular sleeves coaxialy disposed adjacent said central sleeve, and a rigid, C-shaped link mechanically extending between the upper and lower sleeves, said first and second portions adapted to be selectively, torsionally displaced from one another, one of said portions secured to said carriage, said jack column means further comprising means for selectively torsionally locking said first and second portions in predetermined positions relative to one another; and,
   wherein said jack column means includes lock means selectively locking said front wheeled axle to said carriage and articulates said front wheeled axle relative thereto.

2. The trailer assembly as defined in claim 1 wherein said lock means comprises:
   a swingable arm pivoted at one end to said jack column means and terminating in an opposite end in a selector pin;
   a registration boss defined in each of said upper and lower sleeves for selectively receiving said selector pin; and,
   dog means for engaging said central sleeve when said arm is appropriately oriented.

3. The trailer assembly as defined in claim 2, wherein said dog means comprises:

at least one spring loaded latching means for locking said central sleeve relative to said upper and lower sleeves, said spring loaded latching means supported by said arm; and,
at least one boss defined in said central sleeve for selectively receiving said latching means to prevent relative rotation between said central sleeve and said upper and lower sleeves.

4. The trailer assembly as defined in claim 2, wherein said swingable arm is mounted to said jack column means with a spring loaded handle pivotally mounted to said C-shaped link.

5. A boat trailer assembly comprising:
   a wheeled trailer disposed at a rear of said assembly adapted to receive a boat to be transported, said trailer having a rear wheeled axle;
   a separate wheeled axle coupled to a front of said assembly, said wheeled axle comprising tongue means for coupling said assembly to a tow vehicle;
   extensible jack column means for normally pivotally coupling said wheeled axle to said trailer, said jack column means comprising:
   a central sleeve and a sleeve assembly adapted to be selectively, torsionally displaced from one another;
   said central sleeve comprising flange means for connecting it to said trailer; and,
   said sleeve assembly comprising spaced apart, upper and lower sleeves coaxially disposed adjacent said central sleeve and a rigid, C-shaped link mechanically extending between the upper and lower sleeves, said sleeve assembly coupled to said separated wheeled axle; and,
   lock means associated with said jack column means for selectively coupling said central sleeve to said sleeve assembly, thereby locking said separate wheeled axle to said trailer.

6. The coat trailer assembly as defined in claim 5 wherein said lock means comprises:
   a swingable arm pivoted at one end to said jack column means and terminating in an opposite end in a selector pin;
   a registration boss defined in each of said upper and lower sleeves for selectively receiving said selector pin; and,
   dog means for engaging said central sleeve when said arm is appropriately oriented.

7. The boat trailer assembly as defined in claim 6 wherein said dog means comprises:
   a spring loaded latch supported by said arm; and,
   at least one boss defined in said central sleeve for selectively receiving said latch to prevent relative rotation between said central sleeve and said upper and lower sleeves.

8. The boat trailer assembly as defined in claim 7 wherein said swingable arm is mounted to said jack column means with a spring loaded handle pivotally mounted to said C-shaped link.

9. The boat trailer assembly as defined in claim 8 wherein said jack column means further comprises:
   a cylindrical housing captivated by said sleeves;
   an extensible stanchion disposed within said housing;
   a crank means for extending said stanchion relative to said housing;
   a pivoting dolly wheel secured to a lower extreme of said stanchion;

first tab means extending downward from said crank means adapted to register with the registration boss in the upper sleeve and the selector pin; and, second tab means extending upwardly from said dolly wheel adapted to register with said selector pin and said registration boss in the lower sleeve.

10. A lockable articulation retrofit assembly for trailers, said retrofit assembly comprising:

a separate wheeled axle coupled to a front of said trailer, said wheeled axle comprising tongue means for coupling said assembly to a tow vehicle;

a frame adapted to be secured to the forward portion of said trailer, said frame comprising a hitching means disposed in a center of said frame for receiving a tongue of said trailer;

extensible jack column means for normally pivotally coupling said wheeled axle to said trailer, said jack column means comprising:

a central sleeve and a sleeve assembly adapted to be selectively, torsionally displaced from one another;

said central sleeve comprising flange means connecting it to said trailer; and, said sleeve assembly comprising spaced apart, upper and lower sleeves coaxially disposed adjacent said central between the upper and lower sleeves, said sleeve assembly coupled to said separate wheeled axle; and, lock means associated with said jack column means for selectively locking said central sleeve with respect to said sleeve assembly, thereby locking said separate wheeled axle to said trailer.

11. The retrofit assembly as defined in claim 10 wherein said lock means comprises:

a swingable arm pivoted at one end to said jack column means and terminating in an opposite end in a selector pin;

a registration boss defined in each of said upper and lower sleeves for selectively receiving said selector pin; and, dog means for engaging said central sleeve when said arm is appropriately oriented.

12. The retrofit assembly as defined in claim 11 wherein said dog means comprises:

a spring loaded latch supported by said arm; and, at least one boss defined in said central sleeve for selectively receiving said latch to prevent relative rotation between said central sleeve and said upper and lower sleeves.

13. The retrofit assembly as defined in claim 12 wherein said swingable arm is mounted to said jack column means with a spring loaded handle pivotally mounted to said C-shaped link.

14. The retrofit assembly as defined in claim 11 wherein said jack column means further comprises:

a cylindrical housing captivated by said sleeves;

an extensible stanchion disposed within said housing;

a crank means for extending said stanchion relative to said housing;

a pivoting dolly wheel secured to the lower extreme of said stanchion;

first tab means extending downward from said crank means adapted to register with the registration boss in the upper sleeve and the selector pin; and, second tab means extending upwardly from said dolly wheel adapted to register with said selector pin and said registration boss in the lower sleeve.

* * * * *